US009307496B2

(12) United States Patent
Saitoh

(10) Patent No.: US 9,307,496 B2
(45) Date of Patent: Apr. 5, 2016

(54) COMMUNICATION DEVICE AND TRANSMISSION POWER CONTROL METHOD

(71) Applicant: FUJITSU LIMITED, Kawasaki-shi, Kanagawa (JP)

(72) Inventor: Yoshimitsu Saitoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 13/895,285

(22) Filed: May 15, 2013

(65) Prior Publication Data

US 2014/0029525 A1    Jan. 30, 2014

(30) Foreign Application Priority Data

Jul. 25, 2012 (JP) ................. 2012-165101

(51) Int. Cl.
H04W 52/12    (2009.01)
H04W 52/24    (2009.01)
H04W 52/54    (2009.01)
H04W 52/56    (2009.01)
H04W 52/36    (2009.01)

(52) U.S. Cl.
CPC ............ *H04W 52/12* (2013.01); *H04W 52/241* (2013.01); *H04W 52/247* (2013.01); *H04W 52/248* (2013.01); *H04W 52/545* (2013.01); *H04W 52/56* (2013.01); *H04W 52/367* (2013.01)

(58) Field of Classification Search
None
See application file for complete search history.

(56) References Cited

U.S. PATENT DOCUMENTS

| 2001/0055968 | A1* | 12/2001 | Yoshida et al. ............... 455/436 |
| 2006/0014558 | A1* | 1/2006 | Takaki ........................ 455/522 |
| 2007/0173279 | A1* | 7/2007 | Kuroda et al. ............... 455/522 |
| 2008/0045271 | A1  | 2/2008 | Azuma |
| 2009/0029652 | A1* | 1/2009 | Xie et al. ..................... 455/69 |
| 2013/0101061 | A1* | 4/2013 | Clevorn ...................... 375/285 |

FOREIGN PATENT DOCUMENTS

| JP | 07-336291    | 12/1995 |
| JP | 2000-324048  | 11/2000 |
| JP | 2004-266552  | 9/2004  |
| JP | 2008-17009   | 1/2008  |

OTHER PUBLICATIONS

JPOA—Office Action of Japanese Patent Application No. 2012-165101 mailed Feb. 9, 2016, with English translation of the relevant part, p. 1, line 24 to line 25 and line 29 to line 31, of the Office Action.

* cited by examiner

*Primary Examiner* — Ashley Shivers
(74) *Attorney, Agent, or Firm* — Fujitsu Patent Center

(57) ABSTRACT

In a mobile station, an RF receiving unit receives a signal transmitted from another communication device. A reception quality detecting unit detects reception quality on the basis of the received signal. A receiving processing unit extracts a TPC value from the received signal. A transmission power control unit corrects the extracted TPC value on the basis of the detected reception quality. If a conversion condition is satisfied, the transmission power control unit corrects the TPC value. For example, the conversion condition includes a condition in which a first variation direction of the detected reception quality is an inverse of a second variation direction of transmission power represented by the TPC value.

4 Claims, 5 Drawing Sheets

COMMUNICATION DEVICE AND TRANSMISSION POWER CONTROL METHOD

CROSS-REFERENCE TO RELATED APPLICATION(S)

This application is based upon and claims the benefit of priority of the prior Japanese Patent Application No. 2012-165101, filed on Jul. 25, 2012, the entire contents of which are incorporated herein by reference.

FIELD

The embodiments discussed herein are directed to a communication device and a transmission power control method.

BACKGROUND

Conventionally, in wireless communication between mobile stations and base stations, Transmission Power Control (TPC) is used as a technology for controlling the electrical power needed to transmit data from the mobile stations to the base stations.

With TPC, first, a base station receives data from a mobile station and then detects its reception level. The base station transmits a TPC value in accordance with the detected reception level back to the mobile station. Specifically, if the detected reception level is equal to or less than a predetermined value, the base station transmits an instruction to increase the electrical power by a given TPC value. In contrast, if the detected reception level is greater than a predetermined value, the base station transmits an instruction to decrease the electrical power by a given TPC value. A TPC value is transmitted for each frame. Specifically, the TPC is executed in units of one frame. With this TPC, a reception level in a base station can be controlled so that it is within an appropriate range.

Related-art example is described, for example, in Japanese Laid-open Patent Publication No. 2008-17009.

However, the content of an instruction represented by a TPC value may sometimes not accurately indicate the actual propagation environment status. For example, if an instruction to increase electrical power is given even though the actual propagation environment is satisfactory, excessive electrical power is consumed in the device on the transmission side. In contrast, if an instruction to reduce electrical power down is given even though the actual propagation environment is unsatisfactory, there may possibly sometimes be a case in which the transmitted data is not received or in which, even if the data is received, errors often occur. In this state, because the same data is repeatedly transmitted, electrical power consumption increases on the transmission side and the reception side and, furthermore, the resources used for the data transmission are consumed wastefully.

SUMMARY

According to an aspect of an embodiment, a communication device includes a receiving unit that receives a signal transmitted from another communication device; a detecting unit that detects reception quality on the basis of the received signal; an extracting unit that extracts, from the received signal, a control value that controls transmission power of the communication device in which the extracting unit is located; and a correction unit that corrects the extracted control value on the basis of the detected reception quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
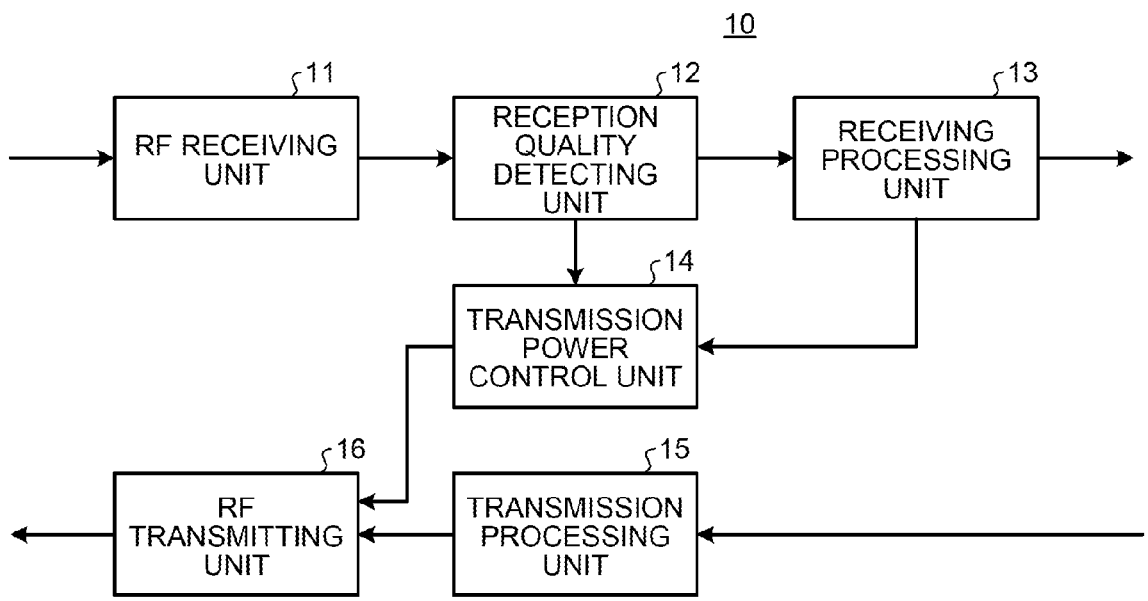
FIG. 1 is a block diagram illustrating an example of a mobile station according to a first embodiment.

Preferred embodiments of the present invention will be explained with reference to accompanying drawings. The communication device and the transmission power control method disclosed in the present invention are not limited to the embodiments. Furthermore, in the embodiments, components having the same function are assigned the same reference numerals; therefore, a description thereof is omitted.

[a] First Embodiment

Configuration of a Mobile Station

FIG. 1 is a block diagram illustrating an example of a mobile station according to a first embodiment. In FIG. 1, a mobile station 10 includes an RF receiving unit 11, a reception quality detecting unit 12, a receiving processing unit 13, a transmission power control unit 14, a transmission processing unit 15, and an RF transmitting unit 16.

The RF receiving unit 11 receives, via an antenna, a radio signal that is transmitted from a base station 50, which will be described later, and performs a received radio signal process (down conversion, analog-to-digital (A/D) conversion, etc.) on the radio signal. The received signal obtained in this way is output to the reception quality detecting unit 12.

The reception quality detecting unit 12 detects reception quality on the basis of the received signal that is received from the RF receiving unit 11. Specifically, the reception quality detecting unit 12 detects, from the received signal, received power as the reception quality. The information on the detected reception quality (hereinafter, sometimes referred to as "reception quality information"), i.e., the information on the received power (hereinafter, sometimes referred to as "received power information") is output to the transmission power control unit 14. Furthermore, the reception quality detecting unit 12 outputs, to the receiving processing unit 13, the received signal that is received from the RF receiving unit 11.

The receiving processing unit 13 demodulates or decodes the received signal received from the RF receiving unit 11; outputs, from among the obtained reception data, a TPC value to the transmission power control unit 14; and outputs the reception data other than the TPC value to the functioning units that are arranged downstream. Specifically, the receiving processing unit 13 extracts the TPC value from the received signal obtained by the RF receiving unit 11 and outputs it to the transmission power control unit 14.

The transmission power control unit 14 uses the reception quality information and the TPC value as an input signal, and, if the "conversion condition" is satisfied, the transmission power control unit 14 converts the TPC value. If the conversion condition is satisfied, the transmission power control unit 14 calculates the transmission power value on the basis of the converted TPC value. In contrast, if the conversion condition is not satisfied, the transmission power control unit 14 calculates the transmission power value on the basis of the TPC value that has not been converted. The calculated transmission power value is output to the RF transmitting unit 16. Consequently, the transmission power value is set in the RF transmitting unit 16 by the transmission power control unit 14.

Figure 2:
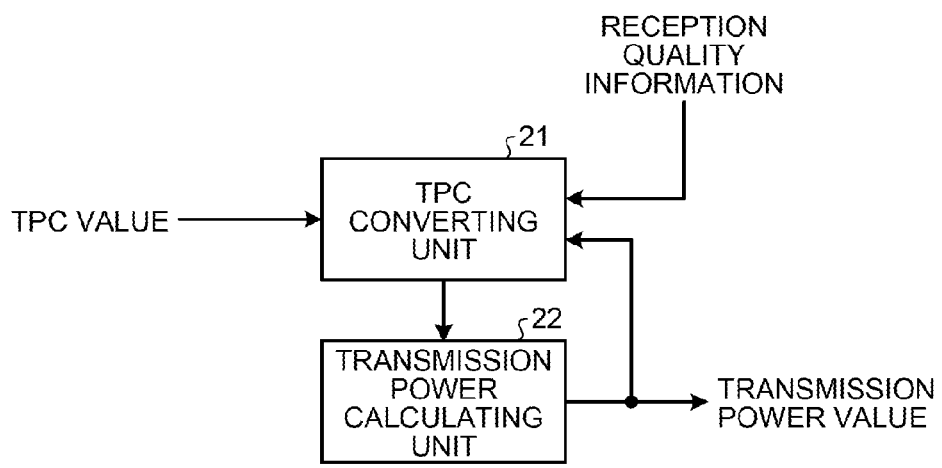
FIG. 2 is a block diagram illustrating an example of the configuration of a transmission power control unit according to the first embodiment.

FIG. 2 is a block diagram illustrating an example of the configuration of the transmission power control unit 14 according to the first embodiment. In FIG. 2, the transmission power control unit 14 includes a TPC converting unit 21 and a transmission power calculating unit 22.

The TPC converting unit 21 uses reception quality information and a TPC value as an input signal and converts the TPC value if the TPC value satisfies the "conversion conditions".

Specifically, the following condition can be set as the conversion condition.

(Condition 1): in a Conversion Target Frame, The variation direction of the reception quality (hereinafter, sometimes referred to as a "first variation direction") and the variation direction of transmission power represented by a TPC value (hereinafter, sometimes referred to as "a second variation direction") differ, i.e., one direction is an inverse of the other.

(Condition 2): A time period is within the "difference determination target time period".

(Condition 3): In a conversion target frame, the first variation direction is an inverse of the second variation direction, and, the continuous number of frames with the same type of inverse state is equal to or greater than the "conversion-start count" up to the conversion target frame. Specifically, for the conversion target frame, the first variation direction is an inverse of the second variation direction and, furthermore, the same inverse state continues in frames, which continue up to the frame immediately previous to the conversion target frame and the number of which corresponds to a "conversion-start count" (hereinafter, sometimes referred to as "continuous determination frame").

(Condition 4): In a frame immediately previous to the conversion target frame, a transmission power value is equal to the "transmission power upper limit".

As for the conversion condition, the Condition 1 may be used by itself; a combination of the Condition 1 and the Condition 2, the Condition 3 or the Condition 4 may be used; or all of the Conditions 1 to 4 may also be used. In the following, a description will be given with the assumption that all of the Conditions 1 to 4 are used.

The TPC converting unit 21 uses a transmission power value, which is output from the transmission power calculating unit 22, as an input signal and uses a frame, in which the transmission power value is equal to or greater than the "reset power value", as a frame that forms a difference determination target time period.

Furthermore, the TPC converting unit 21 converts the TPC value in the "conversion available time period". The "conversion available time period" is the time period from when the conversion condition described above is satisfied until when the number of times the same type of conversion instruction output from a difference determining unit 34 reaches the "conversion target frame set count".

The transmission power calculating unit 22 calculates a transmission power value on the basis of the TPC value that is received from the TPC converting unit 21 and outputs the transmission power value to the RF transmitting unit 16.

Figure 3:
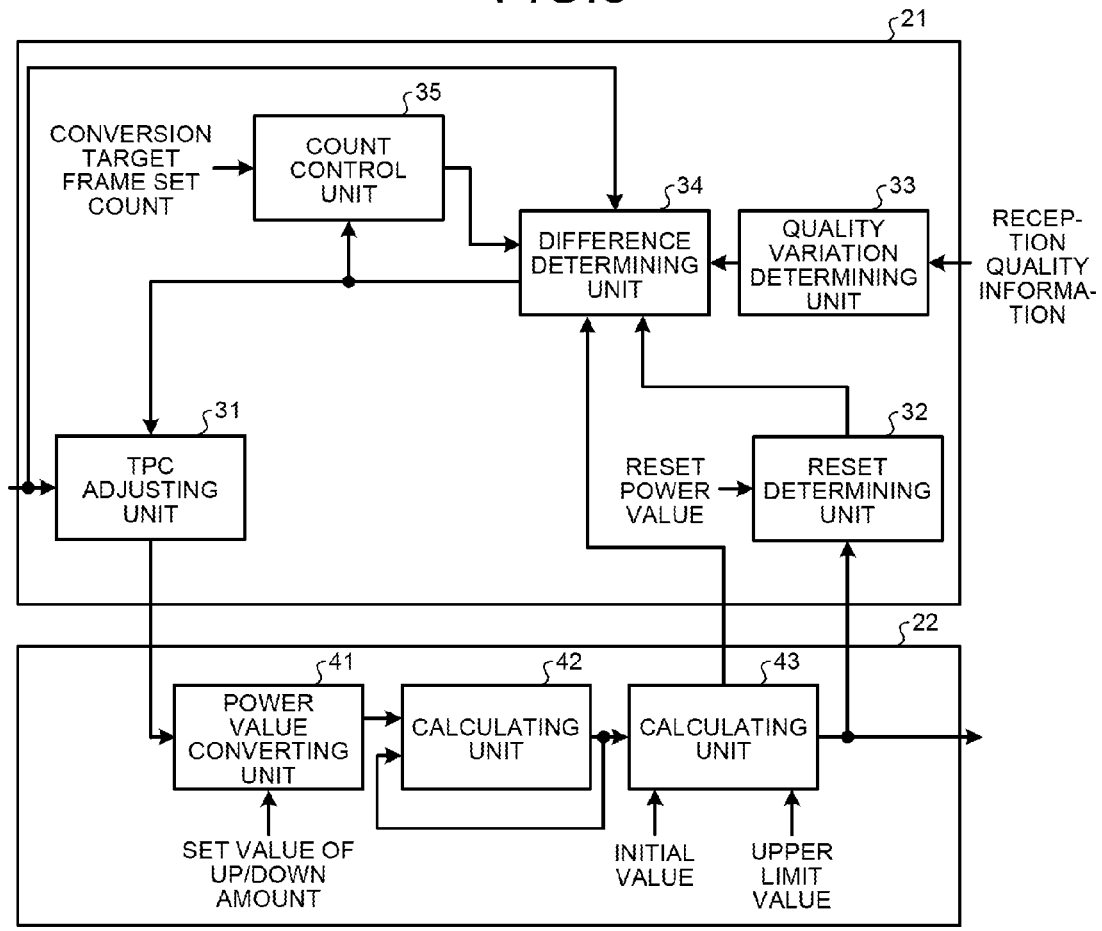
FIG. 3 is a block diagram illustrating an example of a TPC converting unit and the transmission power calculating unit according to the first embodiment.

FIG. 3 is a block diagram illustrating an example of the TPC converting unit 21 and the transmission power calculating unit 22 according to the first embodiment.

In FIG. 3, the TPC converting unit 21 includes a TPC adjusting unit 31, a reset determining unit 32, a quality variation determining unit 33, the difference determining unit 34, and a count control unit 35.

During the conversion available time period, the TPC adjusting unit 31 adjusts the input TPC value on the basis of the "conversion instruction" received from the difference determining unit 34.

Specifically, when receiving, from the difference determining unit 34, a "down conversion command" that is an instruction to be converted to a TCP value of a power reduction and if the input TPC value instructs that power be increased, the TPC adjusting unit 31 converts the input TPC value to a TPC value that instructs that power be reduced, i.e., the TPC adjusting unit 31 performs a correction. In contrast, when receiving, from the difference determining unit 34, a down conversion command and if the input TPC value instructs that power be reduced, no contradiction occurs; therefore, the TPC adjusting unit 31 outputs the received TPC value to the transmission power calculating unit 22 without performing a conversion process. Specifically, if the TPC adjusting unit 31 receives a down conversion command, the TPC adjusting unit 31 outputs a TPC value that instructs that power be reduced regardless of the content of the input TPC value.

Furthermore, when receiving, from the difference determining unit 34, an "up conversion command" that is an instruction to be converted to a TCP value of a power increase and if the input TPC value instructs that power be reduced, the TPC adjusting unit 31 converts the input TPC value to a TPC value that instructs that power be increased. In contrast, when receiving, from the difference determining unit 34, an up conversion command and if the input TPC value instructs that power be increased, no contradiction occurs; therefore, the TPC adjusting unit 31 outputs the received TPC value to the transmission power calculating unit 22 without performing the conversion process.

The reset determining unit 32 compares the previously set "reset power value" with a transmission power value that is input per frame. If the comparison result indicates that the transmission power value exceeds the reset power value, the reset determining unit 32 notifies the difference determining unit 34 of this. Similarly, when the transmission power value becomes equal to or less than the reset power value, the reset determining unit 32 notifies the difference determining unit 34 of this. The time period for which the transmission power value exceeds the reset power value is the difference determination target time period described above.

The quality variation determining unit 33 uses the reception quality information as an input signal and determines the first variation direction described above on the basis of the reception quality information. This determination is performed for each frame. Specifically, for a variation determination target frame, the quality variation determining unit 33 determines whether the reception quality of the variation determination target frame increases or decreases compared with the reception quality of the immediately previous frame. If it is determined that the reception quality increases, the quality variation determining unit 33 outputs an "up notification" to the difference determining unit 34, whereas if it is determined that the reception quality decreases, the quality variation determining unit 33 outputs a "down notification" to the difference determining unit 34.

The difference determining unit 34 determines whether the first variation direction differs from the second variation direction, i.e., one direction is an inverse of the other. If they are inversed relative to each other, the difference determining unit 34 determines the "inverse state type". Furthermore, the difference determining unit 34 count the number of continuous frame with the same type of inverse state. Furthermore, if the transmission power value is equal to or greater than the transmission power upper limit, the difference determining unit 34 receives "upper limit reach notification" from the transmission power calculating unit 22.

Then, the difference determining unit 34 determines whether the conversion conditions described above are satisfied. If the conditions are satisfied, the difference determining unit 34 outputs, to the TPC adjusting unit 31 and the count control unit 35, a conversion instruction according to the inverse state type and "start notification indicating a conversion available time period". Specifically, if the state is "a first type inverse state", the difference determining unit 34 outputs the down conversion command to the TPC adjusting unit 31 and the count control unit 35. The first type inverse state mentioned here is the state in which the first variation direction is in a down direction and the TPC value indicates an increase in power, i.e., the second variation direction is in an up direction. If the state is "a second type inverse state", the difference determining unit 34 outputs the up conversion command to the TPC adjusting unit 31 and the count control unit 35. The second type inverse state mentioned here means that the first variation direction is in an up direction and the TPC value indicates a decrease in power, i.e., the second variation direction is in a down direction.

After receiving a start notification of the conversion available time period, the count control unit 35 counts the number of times the conversion instruction that is the same type of instruction has been output together with the start notification. If the count value reaches a set number for the conversion target frame, the count control unit 35 outputs a "notification indicating that the number of frames has become full" to the difference determining unit 34. Accordingly, a single conversion available time period ends. If the conversion conditions are satisfied again before the count value reaches the set number for the conversion target frame, the conversion available time period also ends during the process and a new conversion available time period may be started.

Furthermore, in FIG. 3, the transmission power calculating unit 22 includes a power value converting unit 41 and calculating units 42 and 43.

If the power value converting unit 41 receives, from the base station 50 that will be described later, a TPC value that instructs that power be increased or decreased, the power value converting unit 41 converts the received TPC value to a value that represents the amount of increase or decrease in power (dB value). Then, the power value converting unit 41 outputs, to the calculating unit 42, a dB value that is the conversion result of the TPC value.

The calculating unit 42 uses, as an input signal, both the dB value from the power value converting unit 41 and an output from the calculating unit 42 and performs addition or subtraction of TPC values with respect to the subject output. This calculating process is performed per frame. The result of the calculation is output to the calculating unit 43.

The calculating unit 43 uses, as an input signal, both the initial value of transmission power and the result of the calculation that is performed by the calculating unit 42 and outputs, as the transmission power value, the result of the addition of the initial value and the calculation result. The transmission power value is output to the reset determining unit 32.

Furthermore, the calculating unit 43 compares a previously retained transmission power upper limit with a transmission power value that is output. If the transmission power value reaches the transmission power upper limit, the calculating unit 43 outputs the upper limit reach notification described above to the difference determining unit 34.

A description will be given here by referring back to FIG. 1. The transmission processing unit 15 uses transmission data as an input signal; encodes and modulates the signal; and outputs the obtained transmission signal to the RF transmitting unit 16.

The RF transmitting unit 16 performs a received radio signal process (e.g., up conversion, digital-to-analog (D/A) conversion, etc.) on the transmission signal that is received from the transmission processing unit 15. The radio signal obtained in this way is transmitted to the base station 50, which will be described later, via the antenna.

Configuration of a Base Station

Figure 4:
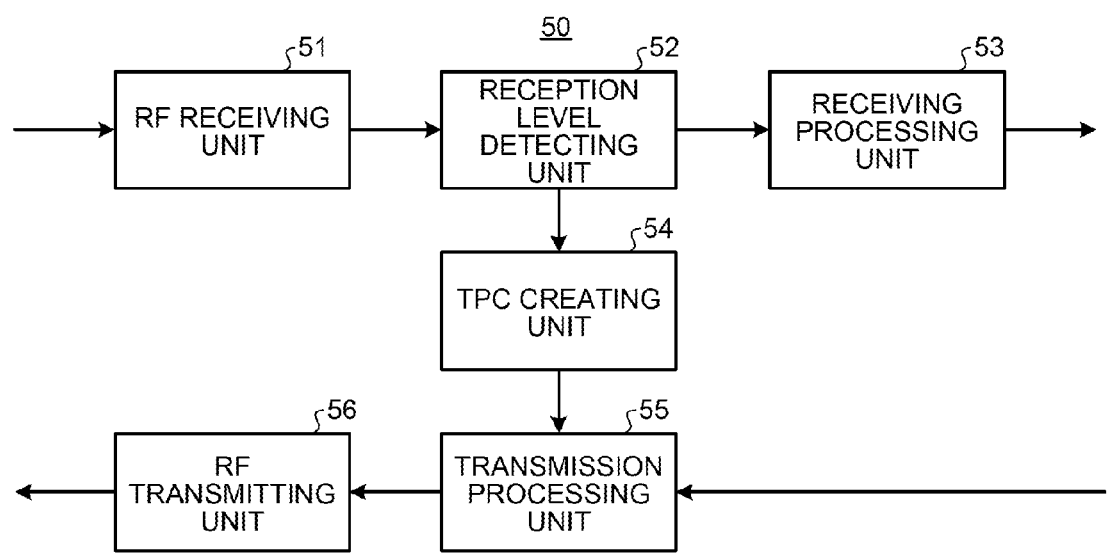
FIG. 4 is a block diagram illustrating an example of a base station according to the first embodiment.

FIG. 4 is a block diagram illustrating an example of a base station according to the first embodiment. In FIG. 4, the base station 50 includes an RF receiving unit 51, a reception level detecting unit 52, a receiving processing unit 53, a TPC creating unit 54, a transmission processing unit 55, and an RF transmitting unit 56.

The RF receiving unit 51 receives the radio signal transmitted from the mobile station 10 via the antenna and performs a received radio signal process (down conversion, analog-to-digital (A/D) conversion, etc.) on the radio signal. The received signal obtained in this way is output to the reception level detecting unit 52.

The reception level detecting unit 52 detects a reception level on the basis of the received signal that is received from the RF receiving unit 51. Information on the detected reception level (hereinafter, sometimes referred to as "reception level information") is output to the TPC creating unit 54. Furthermore, the reception level detecting unit 52 outputs the received signal that is received from the RF receiving unit 51 to the receiving processing unit 53.

The receiving processing unit 53 demodulates and decodes the received signal obtained by the RF receiving unit 51 and outputs the obtained reception data to a functioning unit arranged downstream.

The TPC creating unit 54 determines a TPC value in accordance with the reception level that has been detected by the reception level detecting unit 52 and creates a TPC signal containing the determined TPC value. The TPC signal is output to the transmission processing unit 55.

The transmission processing unit 55 receives, as an input, the TPC signal and transmission data; encodes and modulates them; and outputs the obtained transmission signal to the RF transmitting unit 56.

The RF transmitting unit 56 performs a received radio signal process (up conversion, digital-to-analog (D/A) conversion) on the transmission signal received from the transmission processing unit 55. The radio signal obtained in this way is transmitted to the mobile station 10 via the antenna.

Operation of the Mobile Station

The operation of the mobile station 10 having the above configuration will be described here.

Figure 5:
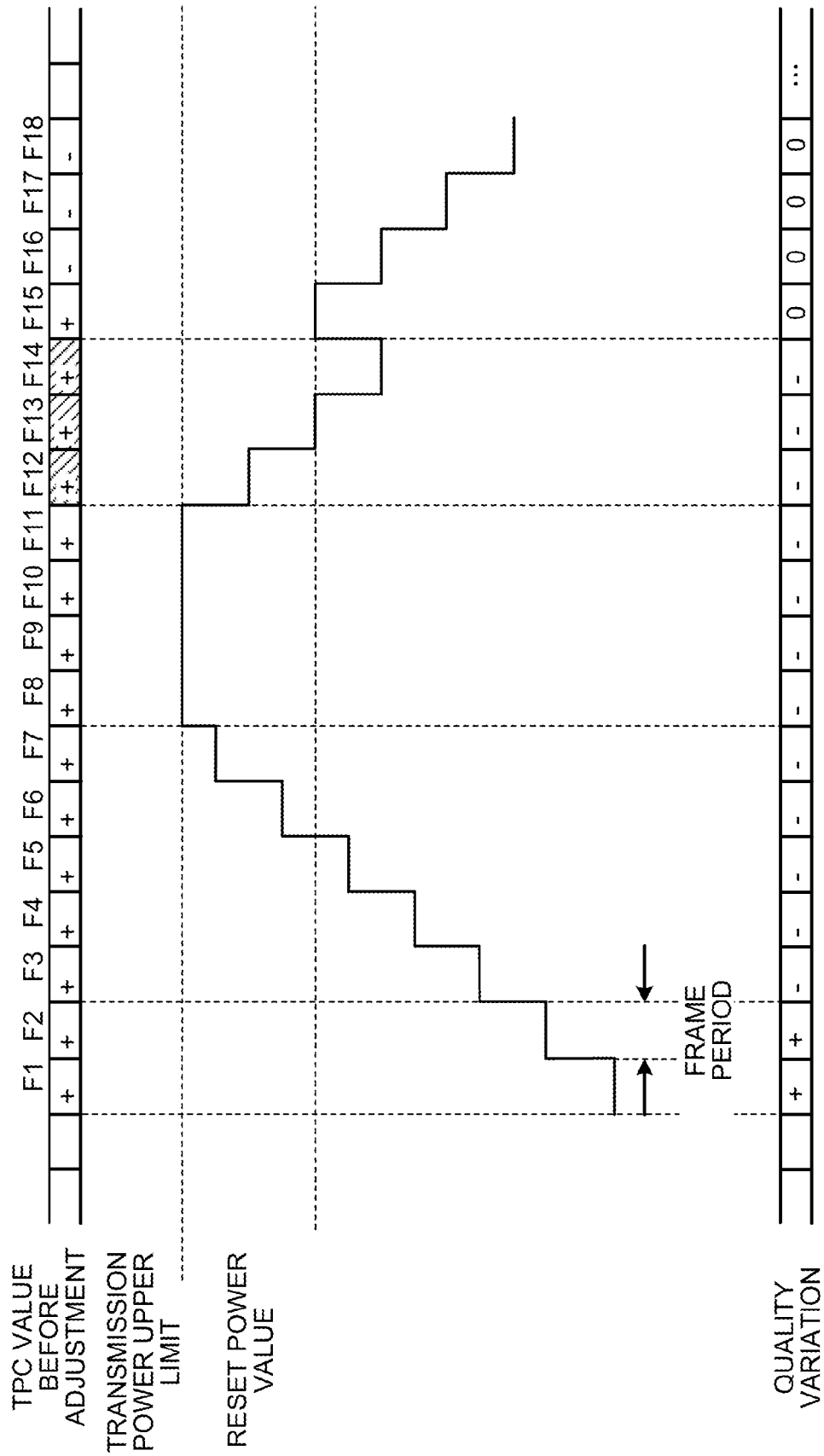
FIG. 5 is a schematic diagram of the first half portion of a timing chart illustrating a transmission power control process performed by the mobile station according to the first embodiment.
Figure 6:
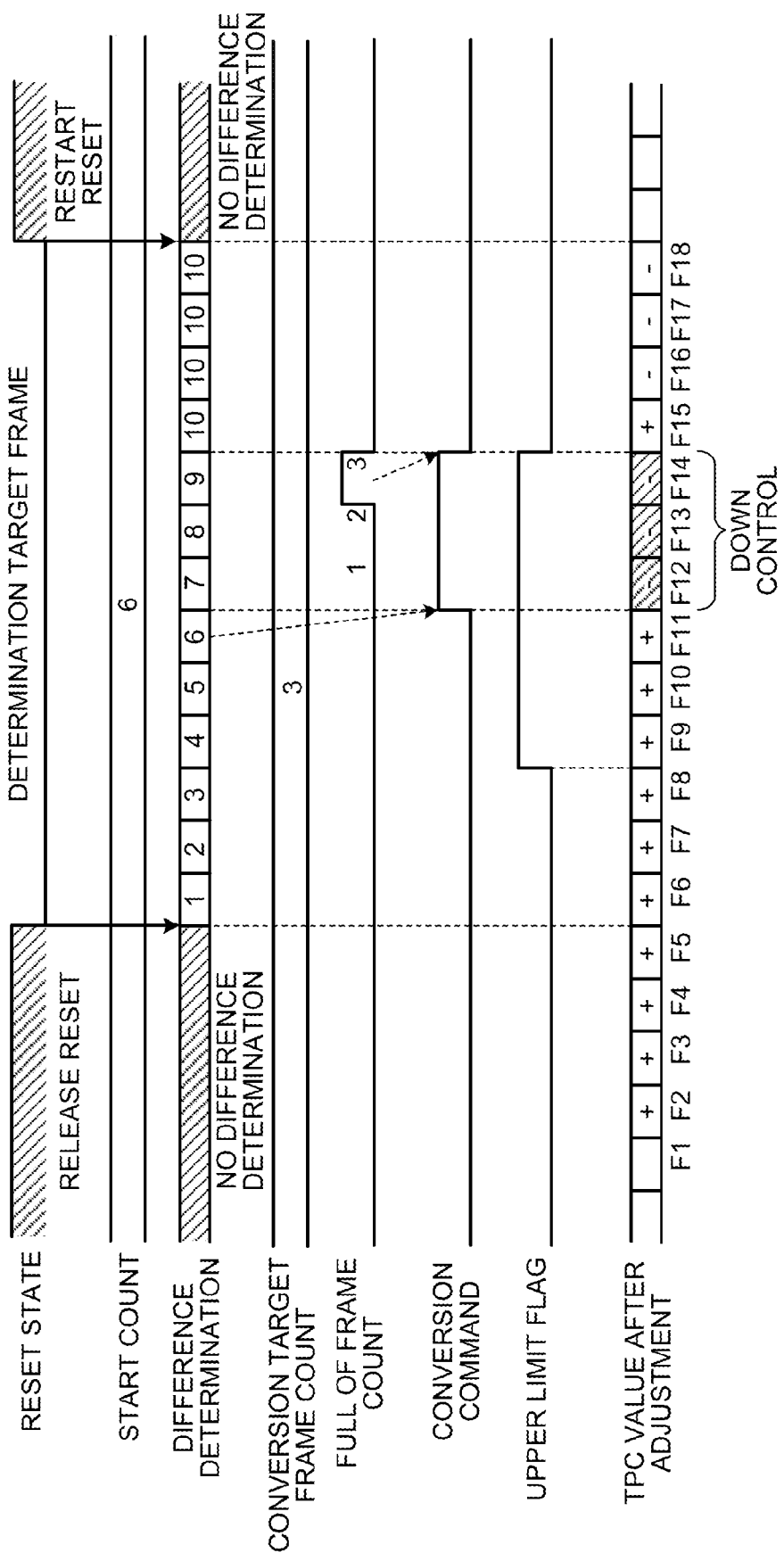
FIG. 6 is a schematic diagram of the second half portion of a timing chart illustrating the transmission power control process performed by the mobile station according to the first embodiment.

FIG. 5 is a schematic diagram of the first half portion of a timing chart illustrating a transmission power control process performed by the mobile station 10 according to the first embodiment. FIG. 6 is a schematic diagram of the second half portion of a timing chart illustrating the transmission power control process performed by the mobile station 10 according to the first embodiment.

A description of the operation will be given with the assumption that, as illustrated in FIG. 5, for frames F1 to F15, the TPC values before adjustment are "+", which represents an increase and, for frames F16 to F18, the TPC values are "−", which represents a decrease. Furthermore, it is assumed that, for frames F1 and F2, the quality variation is "+", which represents an increase and, for frames F3 to F14, the quality variation is "−", which represents a decrease. Furthermore, the amount of increase and decrease is, for example, 2 dB and the frame period is, for example, 1 ms. Furthermore, as illustrated in FIG. 6, it is assumed that "6" is set as a conversion-start count and "3" is set as the set number for the conversion target frame.

In FIG. 5, time t is represented by the x-axis direction, i.e., horizontal direction, and a transmission power values are represented by the y-axis direction, i.e., in the vertical direction. For the transmission power value, a "transmission power upper limit" is set as the unique upper limit of the mobile station 10 and a "reset power value" is set as the power value with which the reset state is released.

The transmission power value of the mobile station 10 rises in accordance with the time elapsed after the frame F1 and then exceeds the reset power value at frame F6. At this point, a notification is output from the reset determining unit 32 to the difference determining unit 34. Accordingly, as illustrated in FIG. 6, the difference determination target time period starts. Furthermore, because the TPC value that indicates an increase in power continues, the transmission power value reaches the transmission power upper limit at frame F8. At this point, an upper limit reach notification is output from the transmission power calculating unit 22. Consequently, an "upper limit flag" is set in the difference determining unit 34.

At this point, for the frames from F6, which is the starting point of the difference determination target time period, to F14, the first type inverse state continues in which the first variation direction is negative and the second variation direction is positive. The difference determining unit 34 counts the number of continuous frames with the same type of inverse state. Then, the count value reaches the conversion-start count "6" at F11, i.e., the Condition 3 is satisfied.

At F12, because all of the Conditions 1 to 4 are satisfied, a conversion instruction in accordance with the inverse state type and a start notification indicating a conversion available time period are output to the TPC adjusting unit 31 and the count control unit 35. In this case, the down conversion command is output as the conversion instruction.

Thereafter, during the time period in which the number of times the down conversion commands are output corresponds to the set number for the conversion target frame "3", the conversion available time period continues. In FIGS. 5 and 6, because down conversion commands are continuously output between the frames F12 to F14, the conversion available time period starts at F12 and ends at F14.

Then, the TPC adjusting unit 31 adjusts the input TPC value on the basis of the conversion instruction received from the difference determining unit 34 during the conversion available time period. In FIGS. 5 and 6, for the frames F12 to F14, because the TPC value indicates an increase in power and the down conversion command is output, the TPC adjusting unit 31 converts the TPC value, which indicates an increase in power, to a TPC value that indicates a decrease in power. Consequently, for frames F12 to F14, the transmission power value decreases from the upper limit.

As described above, according to the embodiment, in the mobile station 10, the transmission power control unit 14 corrects a TPC value on the basis of the detected reception quality.

Consequently, it is possible to adjust the transmission power value of the uplink on the basis of the communication environment of the downlink that has a similar communication environment; therefore, it is possible to improve the accuracy of the control of transmission power.

Specifically, if the conversion conditions are satisfied, the transmission power control unit 14 corrects the TPC value. Furthermore, the conversion condition includes the Condition 1, where the first variation direction of the detected reception quality is an inverse of the second variation direction of the transmission power that represents the TPC value.

Consequently, if the communication environment of the uplink, which is estimated from the communication environment of the downlink, does not match the communication environment of the uplink, which is estimated from the TPC value, the TPC value can be corrected; therefore, it is possible to improve the accuracy of the control of transmission power.

Furthermore, the conversion condition includes the Condition 4, where the transmission power value is the upper limit in the frame immediately previous to the conversion target frame.

Consequently, the TPC value can be corrected when the reduction effect due to excessive power is expected most.

Furthermore, the conversion condition includes the Condition 3, where, for the conversion target frame, the first variation direction is an inverse of the second variation direction and the continuous number of frames with the same type of inverse state is equal to or greater than the conversion-start count up to the conversion target frame.

Consequently, by setting the conversion-start count to an appropriate count, an excessive adjustment can be prevented.

Furthermore, the number of times the TPC is corrected corresponds to the set number for the conversion target frame.

Consequently, by appropriately setting the set number for the conversion target frame, an excessive adjustment can be prevented.

Another Embodiment

[1] In the above description, the conversion available time period is defined by the number of times the TPC value is converted; however, the time period is not limited thereto. Only a predetermined number of frames starting from the frame that satisfies the conversion conditions may also be used as the conversion available time period.

Consequently, the conversion available time period is fixed and thus the TPC value is not corrected unless the conditions are satisfied within the conversion available time period; therefore, excessive adjustment can be further prevented.

[2] In the above description, the TPC value is corrected before the TPC value is converted to the dB value in the power value converting unit 41; however, the configuration is not limited thereto. For example, after the TPC value is input to the power value converting unit 41 first and then converted to the dB value, the converted dB value may also be corrected in the TPC adjusting unit 31. In such a case, the corrected dB value or the dB value that is not corrected is output from the TPC adjusting unit 31 to the calculating unit 42.

[3] In the above description, the reception quality detecting unit 12 detects power as the reception quality; however, the configuration is not limited thereto. For example, the error rate at the receiving processing unit 13 may also be detected as the reception quality.

[4] The mobile station 10 and the base station 50 described above can be implemented by the following hardware configuration.

Figure 7:
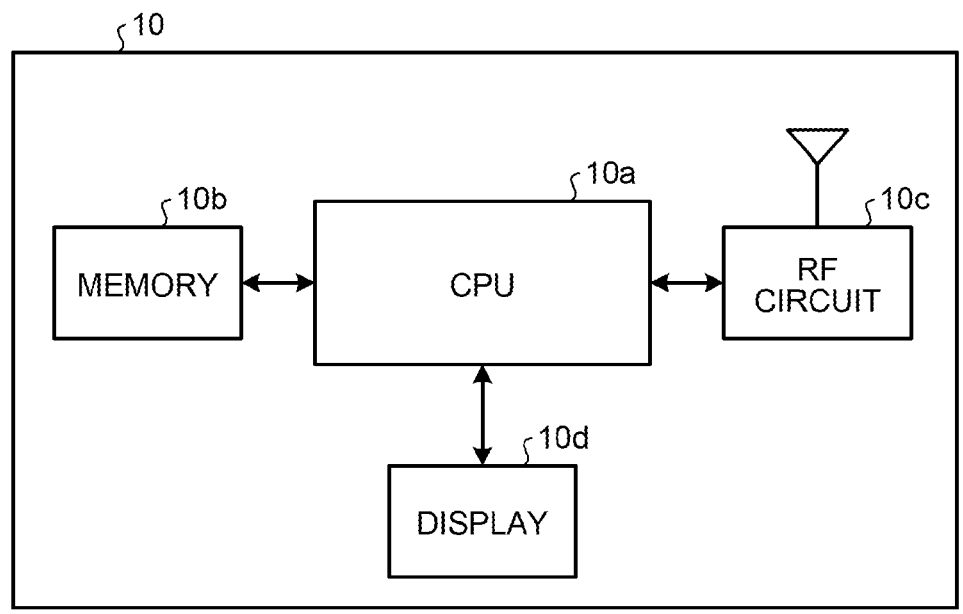
FIG. 7 is a schematic diagram illustrating the hardware configuration of the mobile station.

FIG. 7 is a schematic diagram illustrating the hardware configuration of the mobile station. As illustrated in FIG. 7, the mobile station 10 includes, as hardware, a central processing unit (CPU) 10a, a memory 10b, an RF circuit 10c that includes an antenna, and a display 10d, such as a liquid crystal display (LCD). The memory 10b is formed by, for example, a RAM, a ROM, and a flash memory, such as an SDRAM. The RF receiving unit 11 and the RF transmitting unit 16 are implemented by the RF circuit 10c. Furthermore, the reception quality detecting unit 12, the receiving processing unit 13, the transmission power control unit 14, and the transmission processing unit 15 are implemented by an integrated circuit, such as the CPU 10a.

Figure 8:
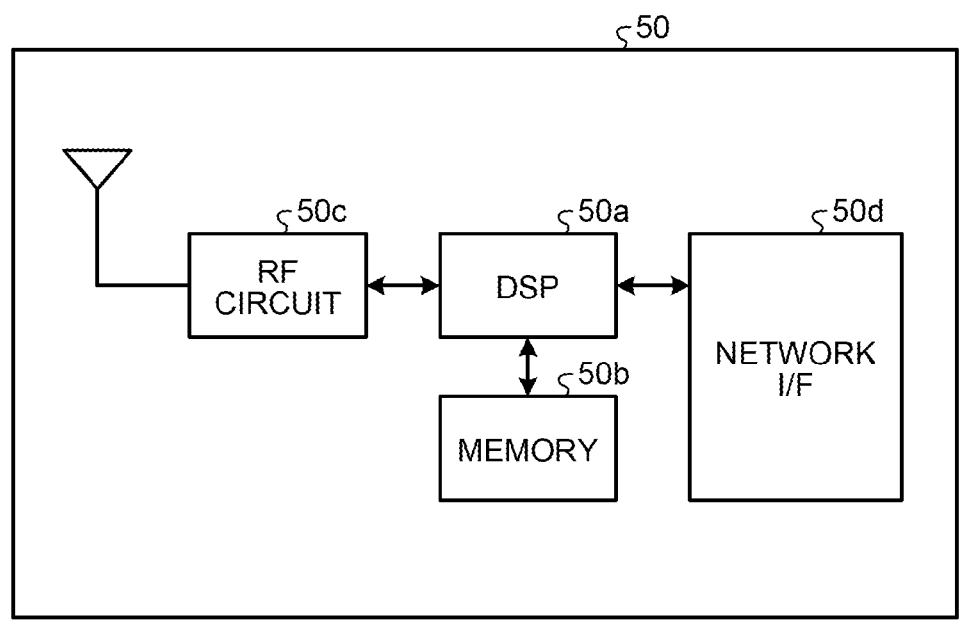
FIG. 8 is a schematic diagram illustrating the hardware configuration of the base station.

FIG. 8 is a schematic diagram illustrating the hardware configuration of the base station. As illustrated in FIG. 8, the base station 50 includes, as components of the hardware, a digital signal processor (DSP) 50a, a memory 50b, a radio frequency (RF) circuit 50c, and a network interface (I/F) 50d. The RF circuit 50c includes an antenna. The memory 50b is formed by, for example, a RAM, a read only memory (ROM), and a flash memory, such as a synchronous dynamic random access memory (SDRAM). The reception level detecting unit 52, the receiving processing unit 53, the TPC creating unit 54, and the transmission processing unit 55 are implemented by an integrated circuit, such as a DSP 50a. The RF receiving unit 51 and the RF transmitting unit 56 are implemented by the RF circuit 50c.

Furthermore, various processes described in the above can be implemented by programs prepared in advance and executed by a computer. Specifically, programs associated with processes executed by the reception quality detecting unit 12, the receiving processing unit 13, the transmission power control unit 14, and the transmission processing unit 15 are stored in the memory 10b and are read by the CPU 10a, where the programs function as processes. Furthermore, programs associated with the reception level detecting unit 52, the receiving processing unit 53, the TPC creating unit 54, and the transmission processing unit 55 are stored in the memory 50b and are read to the DSP 50a, where the programs function as processes.

[5] In the above description, a description has been given using the mobile station 10 and the base station 50; however, it is not limited thereto. The embodiment can be implemented by a first communication device and a second communication device that transmits, to the first communication device, a signal containing a control value that controls the transmission power of the first communication device.

According to an aspect of the embodiment of the present invention, the accuracy of the TPC can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station comprising:
a receiving unit that receives a signal transmitted from a base station;
a detecting unit that detects reception quality on the basis of the received signal, the reception quality varying by frames of the received signal in a first variation direction;
an extracting unit that extracts, from the received signal, a control value that controls transmission power of the mobile station to a second variation direction either increasing or decreasing the transmission power; and
a correction unit that corrects the extracted control value to control the transmission power to an opposite direction of the second variation direction, on the basis of a result of comparing the second variation direction with the first variation direction.

2. The mobile station according to claim 1, wherein
the correction unit corrects the control value when a correction condition is satisfied, and
the correction condition includes a first condition in which the first variation direction of the detected reception quality is an inverse of the second variation direction of the transmission power represented by the extracted control value.

3. A communication device comprising:
a receiving unit that receives a signal transmitted from another communication device;
a detecting unit that detects reception quality on the basis of the received signal;
an extracting unit that extracts, from the received signal, a control value that controls transmission power of the communication device in which the extracting unit is located; and
a correction unit that corrects the extracted control value when a correction condition is satisfied, the correction condition including a first condition in which a first variation direction of the detected reception quality is an inverse of a second variation direction of transmission power represented by the extracted control value and a second condition in which a transmission power value, before control is performed by using the extracted control value, is at an upper limit.

4. A transmission power control method in a mobile station, the transmission power control method comprising:
receiving, by a receiver, a signal transmitted from a base station;
detecting, by a processor, reception quality on the basis of the received signal, the reception quality varying by frames of the received signal in a first variation direction;
extracting, by the processor, a control value that controls transmission power of the mobile station to a second variation direction either increasing or decreasing the transmission power, from the received signal; and
correcting, by the processor, the extracted control value to control the transmission power to an opposite direction of the second variation direction, on the basis of a result of comparing the second variation direction with the first variation direction.

* * * * *